United States Patent
Roberts

(10) Patent No.: US 9,433,202 B1
(45) Date of Patent: Sep. 6, 2016

(54) INSECT TRAP

(71) Applicant: David Roberts, Lake Panasoffkee, FL (US)

(72) Inventor: David Roberts, Lake Panasoffkee, FL (US)

(*) Notice: Subject to any disclaimer, the term of this patent is extended or adjusted under 35 U.S.C. 154(b) by 119 days.

(21) Appl. No.: 14/532,137

(22) Filed: Nov. 4, 2014

(51) Int. Cl.
*A01M 1/10* (2006.01)
*A01M 1/02* (2006.01)

(52) U.S. Cl.
CPC ........ *A01M 1/10* (2013.01); *A01M 1/02* (2013.01)

(58) Field of Classification Search
CPC .................................. A01M 1/10; A01M 1/103
See application file for complete search history.

(56) References Cited

U.S. PATENT DOCUMENTS

| | | | | |
|---|---|---|---|---|
| 914,571 A * | 3/1909 | Heath et al. | ........... | A01M 1/103 43/121 |
| 1,256,329 A * | 2/1918 | Knittle | ............... | 43/118 |
| 1,366,059 A * | 1/1921 | Miller | ............... | A01M 1/02 43/118 |
| 1,499,222 A * | 6/1924 | Kiley | ............... | A01M 1/02 43/107 |
| 1,772,729 A * | 8/1930 | Pisani | ............... | A01M 1/10 43/107 |
| 1,867,252 A * | 7/1932 | Crigler | ............... | A01M 1/02 43/121 |
| 1,999,342 A * | 4/1935 | Reynolds | ............... | A01M 1/02 43/121 |
| 2,796,696 A * | 6/1957 | Kea | ............... | A01M 1/02 43/121 |
| 3,908,302 A * | 9/1975 | Carr | ............... | A01M 1/02 43/121 |
| 4,873,787 A * | 10/1989 | Schneidmiller | ......... | A01M 1/10 43/107 |
| 4,998,376 A * | 3/1991 | Scherjbak | ............... | A01M 1/02 43/121 |
| 5,182,879 A | 2/1993 | Hopkins | | |
| 5,309,668 A * | 5/1994 | Barton | ............... | A01M 1/10 43/121 |
| 5,377,445 A | 1/1995 | Brannon | | |
| 5,522,171 A | 6/1996 | Mandeville | | |
| D383,827 S | 9/1997 | Barbone | | |
| D415,548 S | 10/1999 | Nunes | | |
| 2008/0190010 A1 | 8/2008 | Neal | | |
| 2012/0186137 A1* | 7/2012 | Schneidmiller | ......... | A01M 1/04 43/121 |

* cited by examiner

*Primary Examiner* — Gary Hoge

(57) ABSTRACT

The insect trap includes a tube member of an undefined length that includes a concave wire mesh inserted into distal ends, and secured thereto via a sleeve cap. An item of bait is inserted inside of the tube member in order to lure an insect therein. The concave wire mesh is open on either end such that an insect is able to enter inside of the tube member, but unable to exit. End cap members may be used to permanently seal off the distal ends of the tube member. The tube member is configured to rest on a ground surface. An outer screen member is laid over top of the tube member. The outer screen member is adapted to be secured to the ground surface via anchors.

4 Claims, 6 Drawing Sheets

INSECT TRAP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of insect traps, more specifically, an insect trap that utilizes a tube with concave screens on distal ends in order to trap an insect therein.

SUMMARY OF THE INVENTION

An embodiment of the disclosure meets the needs presented above by generally comprising a tube member of an undefined length that includes a concave wire mesh inserted into distal ends, and secured thereto via a sleeve cap. An item of bait is inserted inside of the tube member in order to lure an insect therein. The concave wire mesh is open on either end such that an insect is able to enter inside of the tube member, but unable to exit. End cap members may be used to permanently seal off the distal ends of the tube member. The tube member is configured to top of the tube member. The outer screen member is adapted to be secured to the ground surface via anchors.

These together with additional objects, features and advantages of the insect trap will be readily apparent to those of ordinary skill in the art upon reading the following detailed description of presently preferred, but nonetheless illustrative, embodiments of the insect trap when taken in conjunction with the accompanying drawings.

In this respect, before explaining the current embodiments of the insect trap in detail, it is to be understood that the insect trap is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the insect trap.

It is therefore important that the claims be regarded as including such equivalent construction insofar as they do not depart from the spirit and scope of the insect trap. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
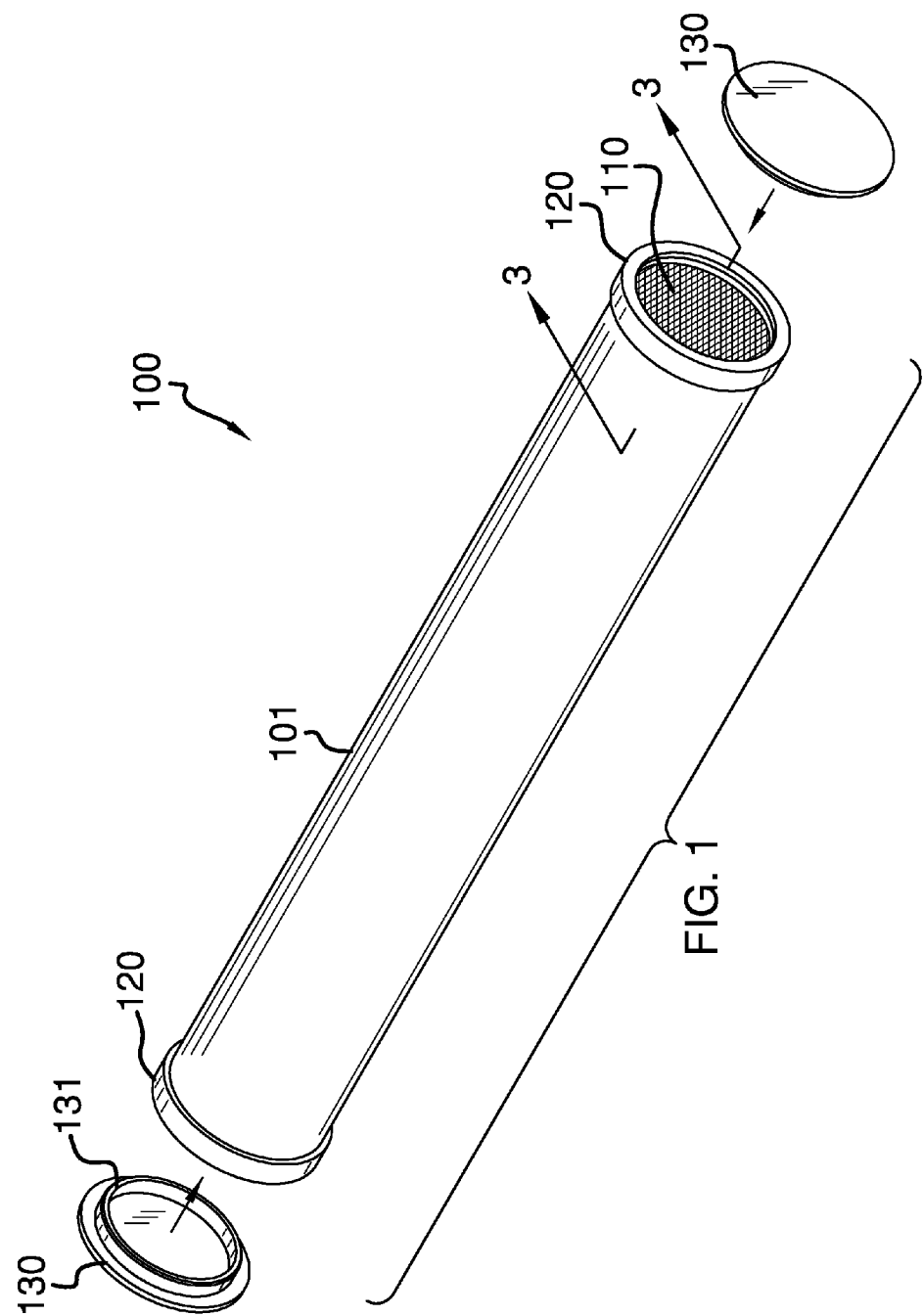
FIG. 1 is a perspective view of an embodiment of the disclosure.
Figure 2:
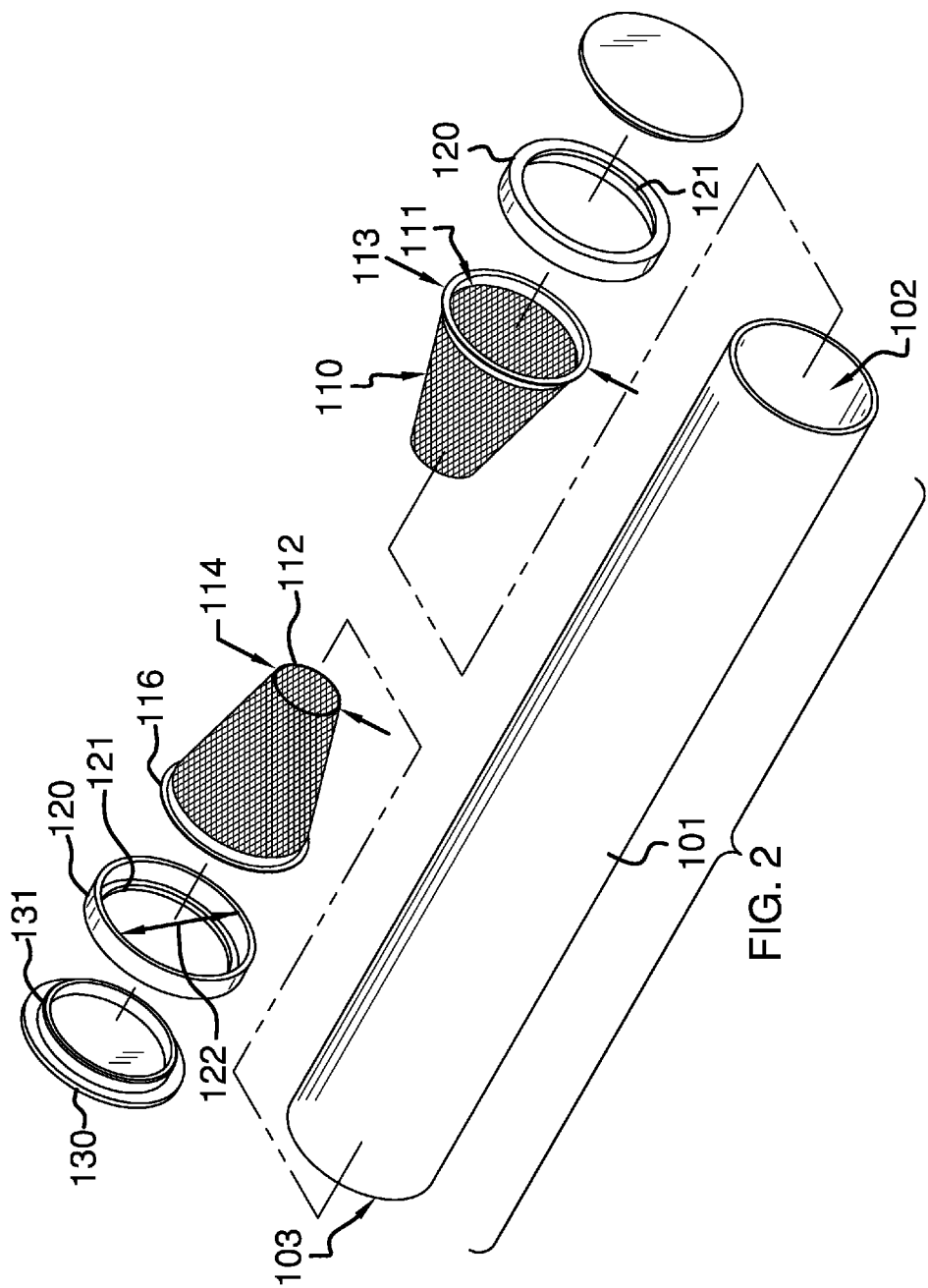
FIG. 2 is an exploded view of an embodiment of the disclosure.
Figure 3:
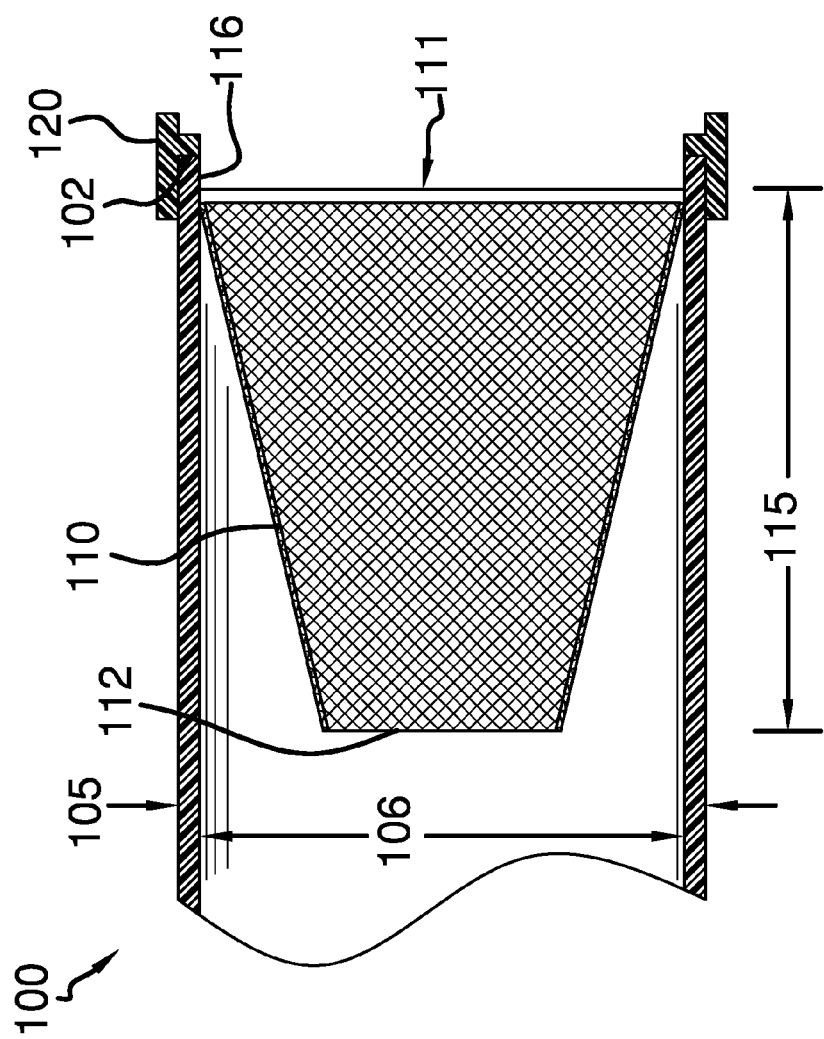
FIG. 3 is a cross-sectional view along line 3-3 in FIG. 1, and of an embodiment of the disclosure.
Figure 4:
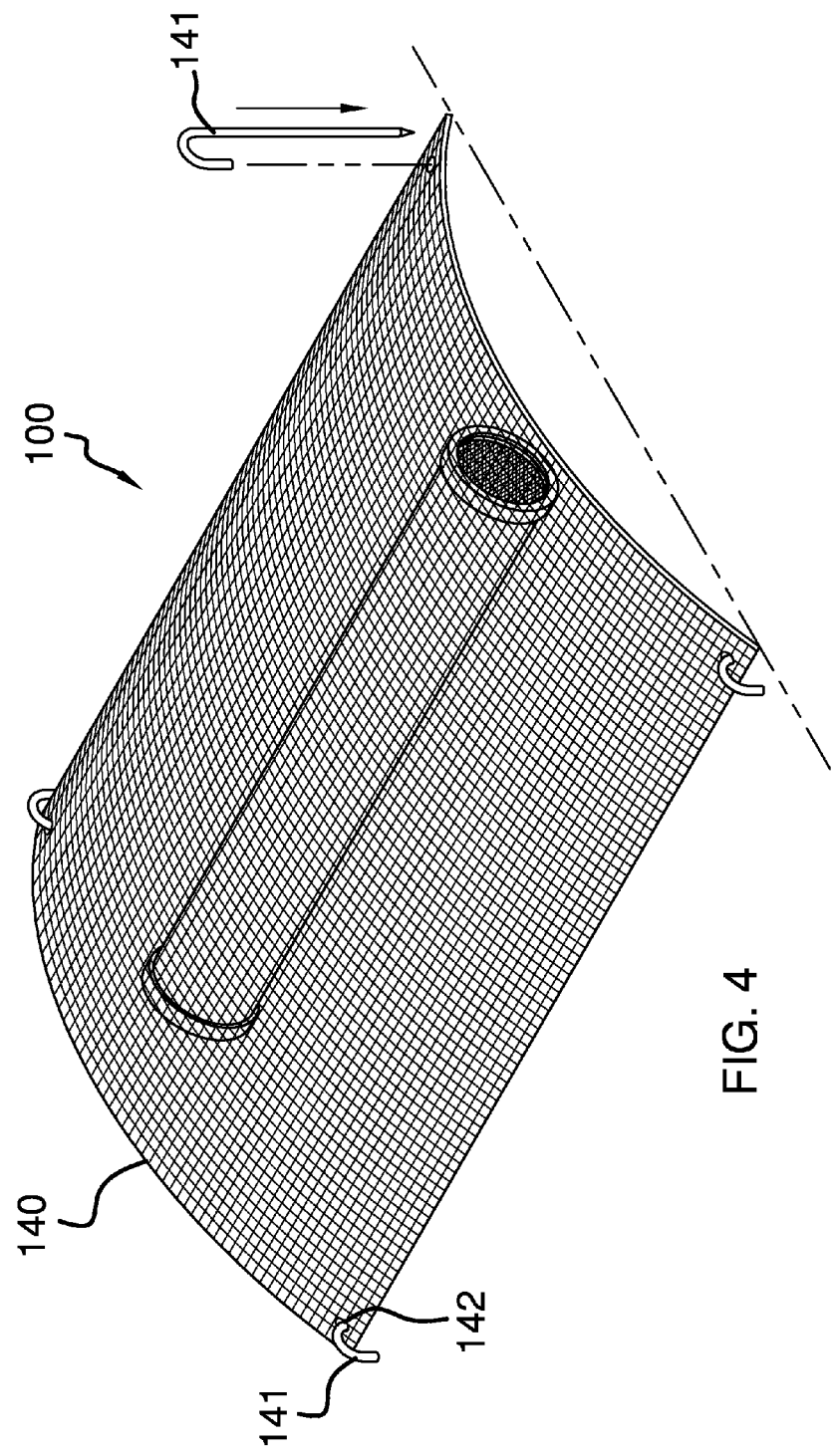
FIG. 4 is another perspective view of an embodiment in use.
Figure 5:
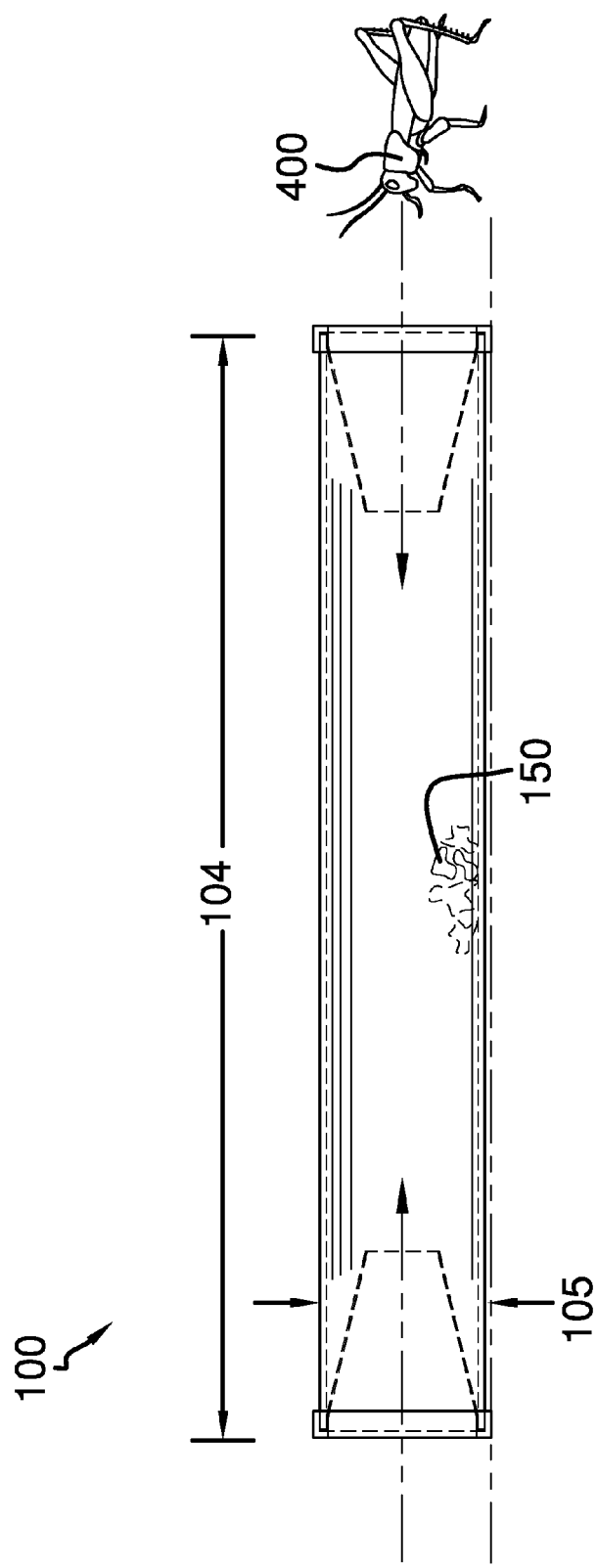
FIG. 5 is a side view of the tube member with bait contained therein.
Figure 6:
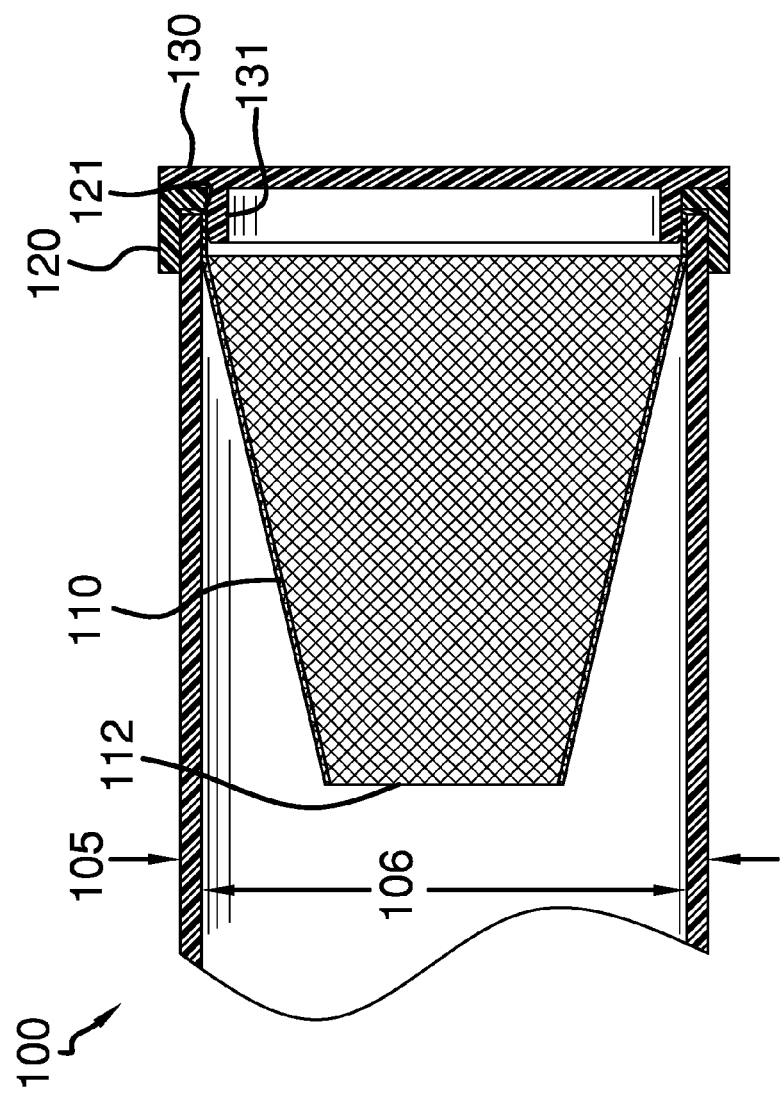
FIG. 6 is a second cross-sectional view along line 3-3 in FIG. 1, and of an embodiment of the disclosure.

As best illustrated in FIGS. 1 through 6, the insect trap 100 (hereinafter invention) generally comprises a tube member 101 that is constructed of a translucent material, and further defined with a first distal end 102 and a second distal end 103. The tube member 101 is further defined with a tube length 104 and a tube outer diameter 105. The tube length 104 is not less than 4 inches; whereas the tube outer diameter 105 is not less than ¼ inch.

The invention 100 includes a pair of concave wire mesh members 110. The concave wire mesh members 110 are identical in size, shape, and construction. Moreover, the concave wire mesh members 110 are each inserted into the first distal end 102 and the second distal end 103 of the tube member 101.

Each concave wire mesh member 110 is further defined with an exterior inlet 111 and an interior inlet 112. The exterior inlet 111 has a first diameter 113 that is less than a tube inner diameter 106. The interior inlet 112 has a second diameter 114 that is less than the first diameter 113. The second diameter 114 is not less than 0.5 inches. The concave mesh members 110 each have a mesh member length 115, which is not less than 2 inches. The exterior inlet 111 includes a collar 116 that is nested against either the first distal end 102 or the second distal end 103 of the tube member 101.

The invention 100 includes a pair of sleeve caps 120 that affix to the first distal end 102 and the second distal end 103 of the tube member 101. Moreover, the pair of sleeve caps 120 secure the concave wire mesh members 110 in place at the first distal end 102 and the second distal end 103 of the tube member 101. The pair of sleeve caps 120 are identical in size, shape, and construction.

The invention 100 also includes a pair of solid end caps 130 that secure to the pair of sleeve caps 120 in order to fully seal off the first distal end 102 and the second distal end 103 of the tube member 101. The pair of solid end caps 130 are identical in size, shape, and construction. The pair of sleeve caps 120 are further defined with a cap opening 121. The pair of solid end caps 130 are each further defined with a protuberance 131 that is able to fit snuggly inside of the cap opening 121 of the pair of sleeve caps 120 in order to fully seal off the first distal end 102 and the second distal end 103 of the tube member 101.

The pair of sleeve caps 120 each have a sleeve inner diameter 122 that is greater than or equal to the tube outer diameter 105 such that the pair of sleeve caps 120 fits snuggly over the first distal end 102 and the second distal end 103 of the tube member 101.

The invention 100 includes an outer screen member 140 that is draped over top of the tube member 101. The tube member 101 is configured to rest on a ground surface 200. The outer screen member 140 secures the tube member 101 to the ground surface 200. The outer screen member 140 is secured to the ground surface 200 via at least one anchor 141. The outer screen 140 includes grommets 142 that enable the at least one anchor 141 to hook onto the outer screen member 140.

In use, an item of bait 150 is inserted into the tube member 101. The concave wire mesh members 110 are inserted into the first distal end 102 and the second distal end 103 of the tube member 101. Moreover, the interior inlets 112 of the concave wire mesh members 110 are inserted inwardly with respect to the tube member 101 such that the exterior inlets 111 of the concave wire mesh members 110 are adjacent the first distal end 102 and the second distal end 103 of the tube member 101. The pair of sleeve caps 120 are seated over the first distal end 102 and the second distal end 103 of the tube member 101. The item of bait 150 is used to attract an insect 400 into the tube member 101, and upon so doing is trapped therein via the concave mesh members 110.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An insect trap comprising:
    a tube member with a concave wire mesh member provided at a first distal end and a second distal end;
    an item of bait is inserted into the tube member, and which is adapted to lure an insect inside of the tube member;
    said concave wire mesh member is adapted to enable said insect to enter into said tube member, but prevents said insect from exiting;
    wherein the tube member is made of a translucent material, and is further defined with a tube outer diameter, and a tube length;
    wherein the tube length is not less than 4 inches; whereas the tube outer diameter is not less than ¼ inch;
    wherein the concave wire mesh members are identical in size, shape, and construction; wherein the concave wire mesh members are each further defined with an exterior inlet and an interior inlet; wherein the exterior inlet has a first diameter that is less than a tube inner diameter;
    wherein the interior inlet has a second diameter that is less than the first diameter; wherein the second diameter is not less than 0.5 inches; wherein the interior inlets of the concave wire mesh members are inserted inwardly with respect to the tube member such that the exterior inlets of the concave wire mesh members are adjacent the first distal end and the second distal end of the tube member;
    wherein the concave mesh members each have a mesh member length, which is not less than 2 inches;
    wherein a pair of sleeve caps are included, and affix to the first distal end and the second distal end of the tube member; wherein the pair of sleeve caps secure the concave wire mesh members in place at the first distal end and the second distal end of the tube member; wherein the pair of sleeve caps are identical in size, shape, and construction;
    wherein a pair of solid end caps secure to the pair of sleeve caps in order to fully seal off the first distal end and the second distal end of the tube member; wherein the pair of solid end caps are identical in size, shape, and construction;
    wherein the pair of sleeve caps are further defined with a cap opening; wherein the pair of solid end caps are each further defined with a protuberance that is able to fit snuggly inside of the cap opening of the pair of sleeve caps in order to fully seal off the first distal end and the second distal end of the tube member;
    wherein the pair of sleeve caps each have a sleeve inner diameter that is greater than or equal to the tube outer diameter such that the pair of sleeve caps fits snuggly over the first distal end and the second distal end of the tube member;
    wherein an outer screen member is draped over top of the tube member; wherein the tube member is configured to rest on a ground surface; wherein the outer screen member secures the tube member to the ground surface.

2. The insect trap according to claim 1 wherein the outer screen member is secured to the ground surface via at least one anchor.

3. The insect trap according to claim 2 wherein the outer screen includes grommets that enable the at least one anchor to hook onto the outer screen member.

4. An insect trap comprising:
    a tube member with a concave wire mesh member provided at both a first distal end and a second distal end;
    an item of bait is inserted into the tube member, and which is adapted to lure an insect inside of the tube member;
    said concave wire mesh member is adapted to enable said insect to enter into said tube member, but prevents said insect from exiting;
    wherein the concave wire mesh member provided at the first distal end and the second distal end are identical in size, shape, and construction;
    wherein the concave wire mesh members are each further defined with an exterior inlet and an interior inlet; wherein the exterior inlet has a first diameter that is less than a tube inner diameter;

wherein the tube member is made of a translucent material, and is further defined with a tube outer diameter, and a tube length; wherein the tube length is not less than 4 inches; whereas the tube outer diameter is not less than ¼ inch; wherein the interior inlet has a second diameter that is less than the first diameter; wherein the second diameter is not less than 0.5 inches; wherein the interior inlets of the concave wire mesh members are inserted inwardly with respect to the tube member such that the exterior inlets of the concave wire mesh members are adjacent the first distal end and the second distal end of the tube member;

wherein the concave mesh members each have a mesh member length, which is not less than 2 inches;

wherein a pair of sleeve caps are included, and affix to the first distal end and the second distal end of the tube member; wherein the pair of sleeve caps secure the concave wire mesh members in place at the first distal end and the second distal end of the tube member; wherein the pair of sleeve caps are identical in size, shape, and construction; wherein a pair of solid end caps secure to the pair of sleeve caps in order to fully seal off the first distal end and the second distal end of the tube member; wherein the pair of solid end caps are identical in size, shape, and construction;

wherein the pair of sleeve caps are further defined with a cap opening; wherein the pair of solid end caps are each further defined with a protuberance that is able to fit snuggly inside of the cap opening of the pair of sleeve caps in order to fully seal off the first distal end and the second distal end of the tube member;

wherein the pair of sleeve caps each have a sleeve inner diameter that is greater than or equal to the tube outer diameter such that the pair of sleeve caps fits snuggly over the first distal end and the second distal end of the tube member;

wherein an outer screen member is draped over top of the tube member; wherein the tube member is configured to rest on a ground surface; wherein the outer screen member secures the tube member to the ground surface;

wherein the outer screen member is secured to the ground surface via at least one anchor; wherein the outer screen includes grommets that enable the at least one anchor to hook onto the outer screen member.

\* \* \* \* \*